United States Patent
Brandt

(10) Patent No.: US 11,261,773 B2
(45) Date of Patent: Mar. 1, 2022

(54) METHOD AND DEVICE FOR MONITORING THE TANK CONTENT OF A STORAGE TANK OF AN EXHAUST-GAS TREATMENT SYSTEM

(71) Applicant: CPT Group GmbH, Hannover (DE)

(72) Inventor: Martin Brandt, Wörth a.d. Donau (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 279 days.

(21) Appl. No.: 16/339,094

(22) PCT Filed: Aug. 10, 2017

(86) PCT No.: PCT/EP2017/070349
§ 371 (c)(1),
(2) Date: Apr. 3, 2019

(87) PCT Pub. No.: WO2018/068924
PCT Pub. Date: Apr. 19, 2018

(65) Prior Publication Data
US 2020/0040787 A1     Feb. 6, 2020

(30) Foreign Application Priority Data
Oct. 12, 2016   (DE) .................... 10 2016 219 834.3

(51) Int. Cl.
*F01N 3/20* (2006.01)
*G01F 23/00* (2022.01)
(Continued)

(52) U.S. Cl.
CPC ......... *F01N 3/208* (2013.01); *G01F 23/0061* (2013.01); *G01F 23/2962* (2013.01);
(Continued)

(58) Field of Classification Search
CPC ................ F01N 3/208; F01N 2610/02; F01N 2610/1406; F01N 2610/1433;
(Continued)

(56) References Cited

U.S. PATENT DOCUMENTS

| 8,482,298 B2 | 7/2013 | Boudaoud et al. ........... 324/652 |
| 9,708,959 B2* | 7/2017 | Hendrickson ......... G01F 23/296 |

(Continued)

FOREIGN PATENT DOCUMENTS

| CN | 101680378 A | 3/2010 | ............. F02D 19/08 |
| CN | 102317587 A | 1/2012 | ............. F01N 11/00 |

(Continued)

OTHER PUBLICATIONS

German Office Action, Application No. 10 2016 219 834.3, 7 pages, dated Jun. 6, 2017.

(Continued)

*Primary Examiner* — Freddie Kirkland, III
(74) *Attorney, Agent, or Firm* — Slayden Grubert Beard PLLC

(57) ABSTRACT

Various embodiments include a method for monitoring the tank content of a storage tank comprising: metering a fluid from the tank into the exhaust gas tract, wherein the fluid has a concentration with respect to a reducing agent; acquiring a current concentration value for the reducing agent; calculating a change in concentration of the reducing agent on the basis of the current concentration value in comparison with a stored concentration value; determining a current operating state of the vehicle to identify an operating state in which refueling cannot be carried out; and carrying out a plausibility check of the calculated change in concentration if the calculated change in concentration exceeds a predetermined (Continued)

threshold value and the operating state is identified. The plausibility check includes acquiring the current tank filling level of the fluid.

6 Claims, 5 Drawing Sheets

(51) Int. Cl.
*G01F 23/2962* (2022.01)
*G01N 29/024* (2006.01)
*G01N 29/44* (2006.01)

(52) U.S. Cl.
CPC ....... *G01N 29/024* (2013.01); *G01N 29/4427* (2013.01); *F01N 2610/02* (2013.01); *F01N 2610/1406* (2013.01); *F01N 2610/148* (2013.01); *F01N 2610/1433* (2013.01); *F01N 2900/0416* (2013.01); *F01N 2900/1814* (2013.01); *F01N 2900/1818* (2013.01); *G01N 2291/0217* (2013.01); *G01N 2291/02809* (2013.01)

(58) Field of Classification Search
CPC ....... F01N 2610/148; F01N 2900/0416; F01N 2900/1814; F01N 2900/1818; F01N 2550/05; F01N 2610/01; F01N 2900/10; F01N 2560/12; F01N 11/00; G01F 23/0061; G01F 23/2962; G01F 25/0061; G01N 29/024; G01N 29/4427; G01N 2291/0217; G01N 2291/02809; Y02A 50/20; Y02T 10/40
See application file for complete search history.

(56) References Cited

U.S. PATENT DOCUMENTS

| | | | |
|---|---|---|---|
| 10,101,193 B2 | 10/2018 | Pfeiffer et al. | |
| 10,386,221 B2* | 8/2019 | Borsoi | ................. G01N 29/024 |
| 2010/0205940 A1 | 8/2010 | Toshioka et al. | ............... 60/276 |
| 2013/0074590 A1 | 3/2013 | Bertow et al. | ............... 73/114.71 |
| 2013/0160433 A1 | 6/2013 | Schepers et al. | ............... 60/295 |
| 2014/0188327 A1 | 7/2014 | Jung | ............................ 701/29.2 |
| 2014/0366512 A1 | 12/2014 | Hodgson et al. | ............... 60/286 |
| 2015/0019108 A1* | 1/2015 | Hendrickson | ......... G01F 23/296 |
| | | | 701/102 |
| 2015/0323373 A1 | 11/2015 | Maguin | ....................... 73/290 V |
| 2015/0354429 A1* | 12/2015 | Thompson | .............. F01N 3/208 |
| | | | 137/4 |
| 2017/0082479 A1* | 3/2017 | Pfeiffer | ............... G01F 25/0061 |

FOREIGN PATENT DOCUMENTS

| | | | | |
|---|---|---|---|---|
| CN | 105298607 A | 2/2016 | ............. | F01N 11/00 |
| CN | 205172704 U | 4/2016 | ............. | F01N 11/00 |
| DE | 10 2009 029 107 A1 | 3/2011 | ............. | F01N 11/00 |
| DE | 10 2009 055 738 A1 | 6/2011 | ............. | F01N 11/00 |
| DE | 10 2010 035 008 A1 | 2/2012 | ............. | F01N 11/00 |
| DE | 10 2011 086 774 A1 | 5/2013 | ............. | F01N 3/10 |
| DE | 10 2012 004 269 A1 | 9/2013 | ............. | F01N 3/10 |
| DE | 10 2014 210 077 A1 | 12/2015 | ........... | G01F 23/296 |
| WO | 2018/068924 A1 | 4/2019 | ............. | F01N 11/00 |

OTHER PUBLICATIONS

International Search Report and Written Opinion, Application No. PCT/EP2017/070349, 12 pages, dated Oct. 19, 2017.
Chinese Office Action, Application No. 201780063436.7, 15 pages, dated Aug. 7, 2020.

* cited by examiner

METHOD AND DEVICE FOR MONITORING THE TANK CONTENT OF A STORAGE TANK OF AN EXHAUST-GAS TREATMENT SYSTEM

CROSS-REFERENCE TO RELATED APPLICATIONS

This application is a U.S. National Stage Application of International Application No. PCT/EP2017/070349 filed Aug. 10, 2017, which designates the United States of America, and claims priority to DE Application No. 10 2016 219 834.3 filed Oct. 12, 2016, the contents of which are hereby incorporated by reference in their entirety.

TECHNICAL FIELD

The present disclosure relates to internal combustion engines. Various embodiments of the teachings herein may include methods and/or devices for monitoring the tank content of a storage tank of an exhaust gas after-treatment system which is based on selective catalytic reduction of an internal combustion engine of a vehicle.

BACKGROUND

Modern diesel engines are increasingly equipped with SCR (SCR: selective catalytic reduction) systems for exhaust gas after-treatment. In this context, an additive, which has a reducing agent, is injected in a controlled fashion into the exhaust system of the engine. The injected additive is then decomposed thermally in the exhaust system, wherein the $NH_3$ which is produced in the process is stored in a catalytic converter which is arranged downstream and where it reacts with $NO_x$ components of the exhaust gas to form reaction products, such as $N_2$, $H_2O$, which are not damaging to the environment. To ensure correct functioning of the SCR system, it is necessary to detect and identify a faulty component and incorrect use of the system in the driving cycle as quickly as possible. Therefore, legislators prescribe that the components of the system which relate to exhaust gas must be monitored while the system is operating. The intention here is to detect both manipulation of the components and a malfunction.

DE 10 2012 004 269 A1 describes a feed unit for feeding a fluid additive from a tank. The feed unit can be mounted in the tank and has a filling level sensor which can emit and receive acoustic waves which are reflected at a surface of the fluid in the tank and passed back to the filling level sensor. In this context, a filling level measurement can be carried out by measuring the propagation time of the waves. In addition, the feed unit has at least one additional sensor means which can be used to ascertain whether frozen additive is present in the tank.

SUMMARY

The present disclosure describes means and methods for monitoring an SCR system which permit a measurement of the filling level and a measurement of the concentration to be carried out in a way which, in comparison with the prior art, is more robust with respect to the additive which has to be carried along in the SCR system. For example, various embodiments include a method for monitoring the tank content of a storage tank (103) of a system (100) which is based on selective catalytic reduction and has the purpose of performing exhaust gas after-treatment of an internal combustion engine of a vehicle, wherein a fluid (101) from the storage tank (103), which fluid (101) has a concentration (K) with respect to a reducing agent is fed into the exhaust gas tract (102) of the vehicle via a line (108) and a metering device (110) of the system (100), having the steps: acquiring (S701) a current concentration value ($K_{neu}$) for the reducing agent, calculating (S703) a change in concentration ($\Delta K$) of the reducing agent on the basis of the current concentration value ($K_{neu}$) in comparison with a stored concentration value ($K_{alt}$), determining (S704) a current operating state of the vehicle, in order to differentiate whether an operating state in which refueling can be carried out is present or not, and carrying out (S708) a plausibility check of the calculated change in concentration ($\Delta K$) if the calculated change in concentration ($\Delta K$) exceeds a predetermined threshold value (th1) and an operating state is present in which refueling is ruled out, wherein a process of acquiring (S702) the current tank filling level ($h_{neu}$) of the fluid (101) is used for the plausibility check.

In some embodiments, the method further comprises initializing (S801) the system (100) with a last known tank filling level ($h_{alt}$) and a last known concentration value ($K_{alt}$).

In some embodiments, the method further comprises determining a change in the filling level ($\Delta h$) of the storage tank (103).

In some embodiments, the method further comprises determining, by using the measured tank filling level ($h_{neu}$), whether a change in the filling level ($\Delta h$) is greater than a predetermined threshold value (th2).

In some embodiments, the plausibility check comprises determining a ratio of the change in concentration ($\Delta K$) with respect to the change in the filling level ($\Delta h$).

In some embodiments, the method further comprises storing (S807) the acquired current concentration value ($K_{neu}$) and the acquired current tank filling level ($h_{neu}$) in a non-volatile memory if an end of the driving cycle of the vehicle is detected (S806).

In some embodiments, the concentration value ($K_{neu}$) and the tank filling level ($h_{neu}$) are acquired by using a speed of sound (v) in the fluid (101).

In some embodiments, the acquisition of the concentration ($K_{neu}$) and/or the acquisition of the filling level ($h_{neu}$) are/is carried out on the basis of a measurement on a reference structure (206, 207), serving as a sensor reference, in the storage tank (103), by which measurement, in particular, the speed of sound (v) in the fluid (101) can be determined.

In some embodiments, if the plausibility check has a negative outcome, a fault of the sensor reference is detected (S805).

As another example, some embodiments include a device for monitoring a tank content of a storage tank (103) of a system (100) which is based on selective catalytic reduction and has the purpose of exhaust gas after-treatment, wherein the system (100) has a controller (114) and a sensor arrangement (104) which is connected to the controller (114) and has the purpose of determining a concentration (K) of a fluid (101) in the storage tank (103) and of determining a filling level (h) of the fluid (101), wherein the controller (114) is configured to detect a current operating state of the vehicle or to receive an information item related to the current operating state from a central control unit of the vehicle, wherein the system (100) is also configured to carry out a plausibility check of a detected change in concentration ($\Delta K$) of the fluid (101) on the basis of a current filling level measurement of the fluid (101) when a predetermined operating state, in particular a driving state, of the vehicle is present.

In some embodiments, the sensor arrangement (104) has one or more ultrasonic sensors.

As another example, some embodiments include a vehicle having an internal combustion engine and a system (100) as described above, wherein the system is connected to a central control unit of the vehicle.

BRIEF DESCRIPTION OF THE DRAWINGS

The teachings of the present disclosure are described in more detail with reference to example embodiments in relation to the appended figures. In the drawings.

DETAILED DESCRIPTION

Figure 1:
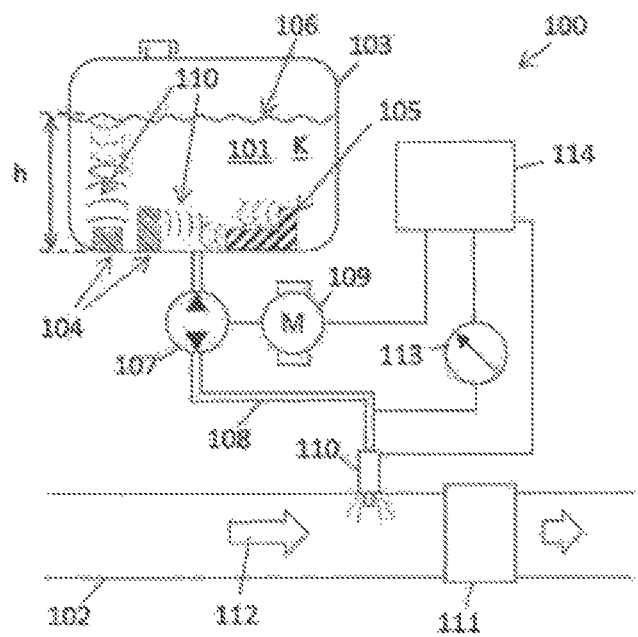
FIG. 1 shows a diagrammatic depiction of an SCR system for metering additive into the exhaust system of an internal combustion engine incorporating teachings of the present disclosure.

In some embodiments, a method for monitoring the tank content of a storage tank of an SCR system basically has the following steps: acquiring a current concentration value for the concentration of a reducing agent in a fluid in the storage tank, calculating a change in concentration on the basis of the current concentration value in comparison with a stored concentration value, determining a current operating state of the vehicle, in order to differentiate whether an operating state in which refueling can be carried out is present or not, and carrying out a plausibility check of the calculated change in concentration if the calculated change in concentration exceeds a predetermined threshold value and an operating state is present in which refueling is ruled out. In this context, a process of acquiring the current tank filling level of the fluid may be used for the plausibility check.

Some embodiments comprise a device for monitoring a tank content of a storage tank of a system which is based on selective catalytic reduction and has the purpose of performing exhaust gas after-treatment. In some embodiments, the system has a controller and a sensor arrangement which is connected to the controller and has the purpose of determining a concentration of a fluid in the storage tank and of determining a filling level of the fluid. In this context, the controller is configured to detect a current operating state of the vehicle and/or to receive an information item related to the current operating state from a central control unit of the vehicle. The system is also configured to carry out a plausibility check of a detected change in concentration of the fluid on the basis of a current filling level measurement of the fluid when a predetermined operating state of the vehicle is present.

Some embodiments include a vehicle having an internal combustion engine and a system as described above, wherein the system is connected to a central control unit of the vehicle. In some embodiments, the predetermined operating state can be a driving state and/or describe a driving cycle. In some embodiments, the sensor arrangement can have ultrasonic sensors.

The robustness of the system can be increased by means of the described combination of a concentration measurement and a filling level measurement or the combination of the signals made available by a filling level sensor and a concentration sensor. In particular, systematic faults can be more reliably detected. In some embodiments, the system is respectively initialized with a last known tank filling level and a last known concentration value.

As a result, comparison values are made available automatically, which promotes a rapid diagnostic time of the system.

In some embodiments, a change in the filling level of the storage tank may be determined. Since this change can be carried out, in particular, when it can be assumed on the basis of the operating state that refueling or a change in the filling level has not been implemented, as a result a reliable plausibility check can be carried out. In some embodiments, the measured tank filling level is used to determine whether a change in the filling level is greater than a predetermined threshold value. As a result, given a suitable selection of the threshold value, the reliability quota of the plausibility check can be increased further.

In some embodiments, the plausibility check comprises determining a ratio of the change in concentration and the change in the filling level. As a result, in particular when there are known or stored functional relationships and/or sensor characteristic curves, a characteristic indication of a systematic fault, such as for example of an incorrectly determined speed of sound, can advantageously be detected. The acquired current concentration value and the acquired current tank filling level may be stored in a non-volatile memory if an end of the driving cycle of the vehicle is detected.

In some embodiments, the concentration value and the tank filling level are acquired using a sound of speed of the fluid. In this context, the acquisition of the concentration and/or the acquisition of the filling level are/is carried out on the basis of a measurement on a reference structure, serving as a sensor reference, in the storage tank, by which measurement, in particular, a speed of sound in the fluid can be determined. As a result, faults in the reference structure can be detected and differentiated in a particularly reliable and simple way. As result, on one hand, the system availability can be improved, wherein, on the other hand, in the case of a component fault, a suitable countermeasure or repair measure can be initiated as quickly as possible.

In comparison with a conventional solution in which the sound propagation time in the fluid has to be determined redundantly so that a modification of the reference structure can be detected, the aspects of the invention allow, for example, implementation of a second, additional reference structure, to be dispensed with. In some embodiments, even if a reference which the sensor itself could not sufficiently perform plausibility checking on is used to determine the speed of sound for a filling level sensor or a concentration sensor, it is now possible, in contrast with the prior art, to differentiate easily between a fault in the reference structure and a changed medium concentration. In some embodiments, if the plausibility check according to the method supplies a negative result, a fault in the sensor reference can be detected and can be output to the driver or to a central control unit of the vehicle, so that suitable alternative reactions can be initiated.

In the figures, identical or similar components are provided with the same reference signs. FIG. 1 shows a diagram of an SCR system 100 for metering additive 101 into the exhaust system 102 of an internal combustion engine (not shown) according to an embodiment of the teachings of the present disclosure. The exemplary SCR system 100 shown here has a storage tank 103 for supplying the additive 101, here: a 32.5% aqueous urea solution or urea. A sensor arrangement 104 is installed at the bottom of the storage tank 103. The sensor arrangement 104 is provided for measuring a tank filling level h, i.e. the filling level of the additive 101 in the storage tank 103 and the concentration K of the additive 101, i.e. the proportion of reducing agent or urea. In addition, a reference structure arrangement 105 which serves as a reference for measurements, here: speed of sound measurements of the sensor arrangement 104 and which is explained further below in more detail is installed in the tank 103. In FIG. 1, the surface 106 of the fluid of the additive 101 is also shown in the storage tank 103.

The storage tank 103 is connected via a pump 107 to a line functioning as a pressure accumulator 108. The pump 107 is provided with a drive motor 109 and may be operated in both the forward and reverse directions. A valve 110 for metering the urea fluid 101, i.e. the additive 101, into the exhaust gas tract 102 of the vehicle is connected to the pressure accumulator or to the line 108. Downstream of the valve 110, an SCR catalyst 111 is arranged in the exhaust gas tract 102 for reducing harmful nitrogen oxides in the exhaust gas stream 112 by means of the injected additive 101. In addition, a pressure sensor 113 is connected to the line 108, as a system pressure sensor for measuring the line pressure. The system 100 furthermore has a controller 114 which is connected, in particular, to the drive motor 109 of the pump 108, to the pressure sensor 113 and to the valve 110.

While the SCR system 100 is operating, the additive 101 is fed from the storage tank 103 into the line 108 using the pump 107. In this context, the operating pressure $P_{sys}$ in the line 108 can, as already mentioned, be monitored by means of the pressure sensor 113. While the internal combustion engine is operating, the metering valve 110 is used to meter in each case a currently necessary quantity of the additive 101 into the exhaust system 102. This generally takes place in response to a respective metering request as a function of the load state of the SCR catalytic converter 111 and the current $NO_x$ raw emissions which it is aimed to reduce. In the SCR catalytic converter 111 catalytically supported conversion of the nitrogen oxides NO and $NO_2$ into non-poisonous reaction products $N_2$ and $H_2O$ takes place.

The additive 101 has to be regularly topped up by the vehicle operator in accordance with the consumption. Since it is not possible to ensure a reduction in the $NO_x$ emissions in the case of a fluid which is different from urea, such as for example water, legislators require that both the tank filling level h and the concentration K of the additive 101 in the vehicle are monitored. If the driver wishes to operate his SCR system 100 without urea 101 or with an alternative fluid such as, for example, water, the SCR system 100 must detect this and as a last resort deactivate the vehicle after a suitable warning scenario.

Figure 2:
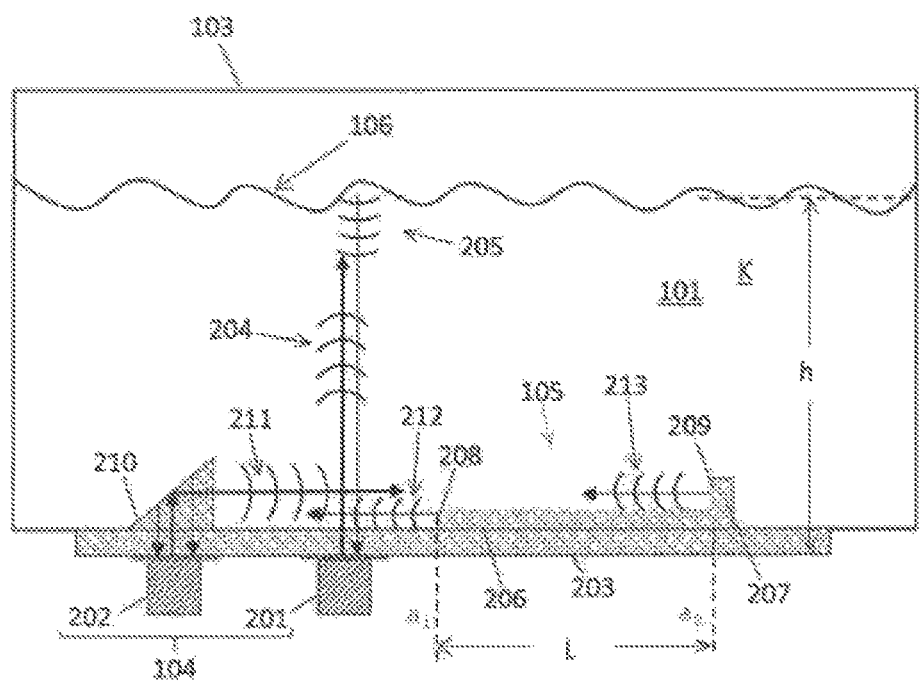
FIG. 2 shows a schematic illustration of a storage tank for an additive, wherein the storage tank has an installed sensor arrangement and a reference structure for determining a speed of sound, incorporating teachings of the present disclosure.

In the following description, the reference symbols introduced in conjunction with FIG. 1 are used again to explain further details. FIG. 2 shows an enlarged schematic illustration of a storage tank 103 for the additive 101. In this context, FIG. 2 shows, inter alia, an example of a sensor arrangement 104, similar to that which is illustrated in FIG. 1, wherein the associated sensors 201, 202 in FIG. 2 are arranged so as to be embedded in the floor area, on a lower surface 203 of the storage tank 103. The concentration K of the urea fluid is, as has already been mentioned above, 32.5% here, wherein this value has been selected for the embodiment of the SCR system 100 shown here since it is obtained from real applications. The compliance with the predetermined concentration value K is important for the satisfactory functioning of the reduction in pollutants and is to be correspondingly monitored. Furthermore, the filling level h is to be monitored. For this purpose, the sensors 201, 202, embodied here as ultrasonic sensors, are used.

In the embodiment shown, a filling level measurement is firstly performed by the sensor 201, in order to measure the filling level h of the additive 101. The sensor 201 has, for the filling level measurement, a transmitter and a receiver for ultrasonic waves, wherein the transmitter and the receiver are not shown explicitly in the drawing for the sake of simplicity. For the filling level measurement, use is made of the fact that an ultrasonic pulse which is emitted by the transmitter of the sensor 201 is reflected at the surface 106 of the fluid and can subsequently be detected in the ultrasonic receiver, i.e. the receiver of the sensor 201. This is illustrated symbolically in the drawing, see in this respect the emitted wave 204 and the received or reflected wave 205. The wave 204 which is emitted by the sensor 201 is characterized figuratively by an arrow which extends from the sensor 201 on the underside 203 of the storage tank 103 in the direction of the surface 106 of the fluid. Similarly, the reflected wave 205 is symbolized by an arrow which runs in the opposite direction and which impinges on the sensor 21, in order thereby to indicate the detection in the receiver part of the sensor 201. The reflected wave 205 is illustrated with lower intensity compared to the emitted wave 204 for reasons of clarity and ease of illustration. The propagation time of the ultrasonic pulse 204, 205 from the transmitter to the receiver is, given the known speed of sound v in the fluid 101, a measure of the filling level h where the following applies:

$$h = v \cdot t_p/2,$$

where v: the speed of sound of the ultrasonic wave 204, 205 in the fluid 101, $t_p$: the propagation time of the ultrasonic pulse 204, 205 between the receiver and transmitter, wherein the following applies here transmitter=receiver=sensor 201, and h: distance of the sensor 201 from the surface 106 of the fluid=tank filling level. In other words, given a known speed of sound v, the filling level height h can be inferred from the propagation time of the pulse $t_p$, and thus the time difference between the emission of the wave 204 and the reception of the reflected wave 205.

In addition, in order to determine the urea concentration K, use is made of the fact that the speed of sound v within the SCR tank 103 depends on the physical properties of the fluid 101. For the measurement evaluation, use is made here, in particular, of the fact that the speed of sound v is dependent on the temperature T and the urea concentration K in the fluid 101. The fluid is, as said, normally the above-mentioned urea fluid and/or the additive 101 which constitutes a 32.5% urea solution.

The speed of sound v is therefore the central variable with which, given a known fluid temperature T, both the filling level h and the urea concentration K can be determined. In order to determine the speed of sound v in the fluid 101 to be tested, a reference structure arrangement 105 with a known geometric dimension is usually used, with the result that the speed of sound v can be easily determined from the determination of reflections 212, 213 which are caused by the reference structure arrangement 105. In general, the following applies:

$$v = L/(t_2 - t_1),$$

where L: known distance between determined interference geometries 208, 209 of the reference structure arrangement 105, and $t_1$, $t_2$: propagation times of the sound waves 211 which are reflected at the reference structure arrangement 105. The speed of sound v which is determined in this way is used by the sensor arrangement 104 both for the determination of the tank filling level h and for the determination of the urea concentration K.

In the text that follows, the reference measurement for the determination of the speed of sound v is described in more detail. The sensor 202 corresponds to the reference structure arrangement 105, wherein the reference structure arrangement 105 has a first reference structure 206 and a second reference structure 207. As result, a stepped interference geometry is obtained which is reflected in the various propagation times of the corresponding ultrasonic waves 212, 213. To be more precise, the first reference structure 206 has a first side face 208 in the direction of the sensor 202, and the second reference structure 207 has a second side face 209 in the direction of the sensor 202. The first side face 208 is arranged at an effective distance $a_1$ from the sensor 202, and the second side face 209 is arranged at an effective distance $a_2$ from the sensor 202.

In addition, in the case of the sensor 202, a mirror structure 210 is arranged and, as shown in FIG. 2, deflects the waves 211, 212, 213, emitted and received by the sensor 202, with respect to the direction of the reference structure arrangement 105 and/or perpendicularly with respect thereto. In order to carry out the reference measurement, the sensor 202, or its transmitter, emits an ultrasonic wave 211 whose reflected waves 212, 213 are received by the receiver of the sensor 202. In this context, a first reflection wave 212 is reflected by the first reference structure 206, or its front side 208, and a second reflection waved 213 is reflected by the reference structure 207, or its front side 209. The difference between the distances $a_1$ and $a_2$ corresponds to the above-mentioned length L of the interference geometry which results in the different propagation times $t_1$ and $t_2$, i.e. a propagation time difference $\Delta t$. Therefore, the speed of sound v can be measured by the sensor 202 by means of the reference structure arrangement 105.

A fault mechanism which influences the function of the reference structure therefore has, under certain circumstances, effects both on the filling level measurement and on the urea concentration measurement. Therefore, a fault in the reference structure of the concentration sensor or of the filling level sensor conventionally results in an incorrect determination of the speed of sound v by the sensor in the medium.

An exemplary fault mechanism would be, for example, detachment of the reference geometry, wherein the latter is usually a solid metal part which is connected to the plastic surface of the sensor and which is therefore subject, for example, to impacts by pieces of ice within the tank. Such detachment would result in a speed of sound measurement being impossible or not very informative, since the reference is missing. Such a fault situation can be detected independently by the sensor, since the expected reflections by the reference structure are completely or at least partially missing.

Another fault source can be the accumulation of particles on the reference structure, with the result that the geometry of the element changes. This results in the speed of sound measurement being permanently falsified since the sensor assumes a nominal geometry of the reference structure, but this is falsified. The sensor conventionally could not independently detect this. A further fault situation would be, for example, an accumulation of air bubbles on the reference structure. This would result in the sound waves generally being reflected diffusely by the air bubbles, with the result that determination of the speed of sound is at least temporarily impossible.

Figure 3:
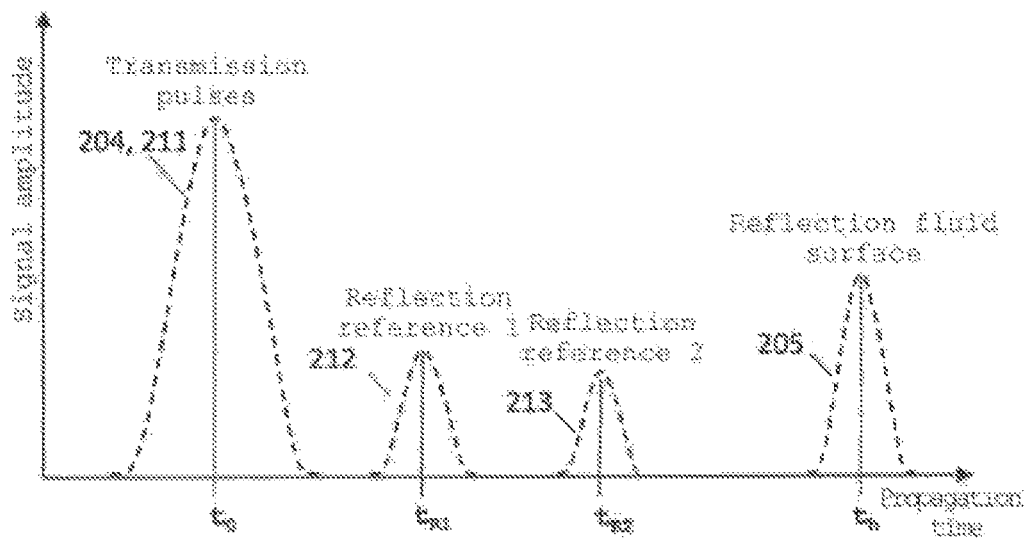
FIG. 3 shows typical signals of an ultrasonic sensor in conjunction with a reference structure, for determining the urea concentration and the urea tank filling level in an SCR system, incorporating teachings of the present disclosure.

FIG. 3 shows typical signals of an ultrasonic sensor in conjunction with a reference structure, for determining the urea concentration K and the urea tank filling level h in an SCR system 100, according to an embodiment of the teachings of the present disclosure. In this context, in the illustrated diagram, the signal amplitude of ultrasonic pulses is plotted on the y-axis, and the x-axis indicates the propagation time of the respective pulses. As is shown in FIG. 3, transmission pulses are emitted at the time $t_0$, meaning, in particular, the two ultrasonic waves 204, 211 in FIG. 2 which coincide chronologically in the illustration in FIG. 3. At the time $t_1$, a first reflection is received as reference 1, which corresponds to the reception of the reflected wave 212 from FIG. 2. At the time $t_2$, a second reflection is received as reference 2, which corresponds to the reception of the reflected wave 213 from FIG. 2. Finally, at the time $t_h$ the reflection 205 from the surface 106 of the liquid is received by the ultrasonic sensor 201.

Figure 4:
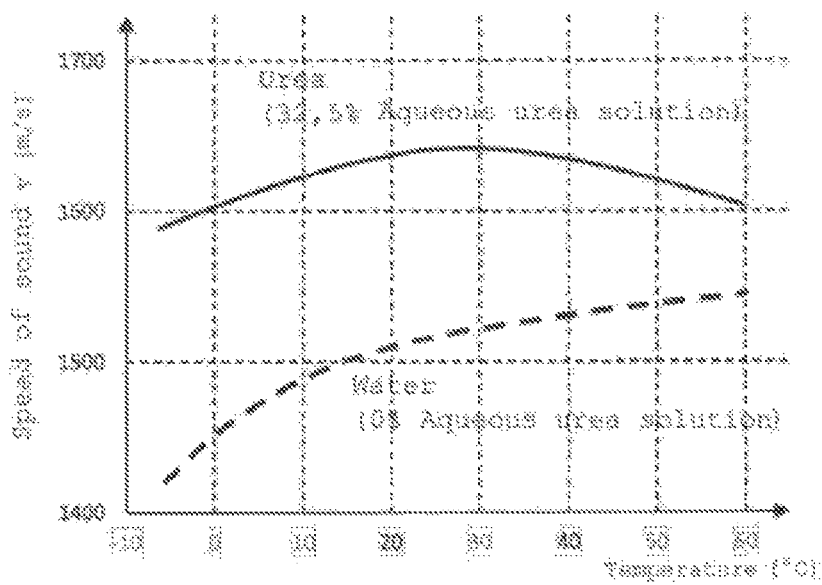
FIG. 4 shows a diagram which represents a graph of the speed of sound as a function of a medium temperature and a medium composition in an SCR tank, incorporating teachings of the present disclosure.

FIG. 4 shows a diagram in which the speed of sound v is specified as a function of the medium temperature T and the medium composition K in an SCR tank 103 according to an embodiment of the teachings of the present disclosure. As shown in FIG. 4, in all the temperature ranges considered, the 32.5% urea solution 101 has a speed of sound v which is relatively high in comparison with that in pure water and which assumes a specific temperature-dependent profile. A change in the urea concentration K will become apparent in a change in the speed of sound v. On the other hand, a fault in the reference structure arrangement 105 described above would result in an incorrect determination of the speed of sound v by the sensor 202 in the medium 101.

Figure 5:
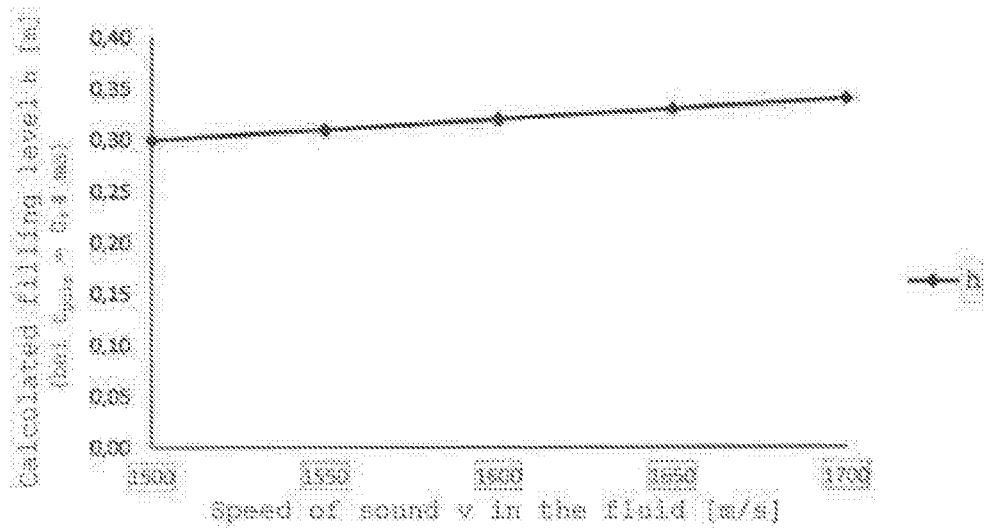
FIG. 5 is a diagram showing an influence of the speed of sound on a tank filling level acquired by the sensor, incorporating teachings of the present disclosure.

FIG. 5 shows a graph which illustrates the functional relationship between the calculated filling level h and the speed of sound v in the additive 101 or in the fluid. As is apparent from FIG. 5, the calculated value of the filling level h rises as the speed of sound v increases, wherein in the example shown the relationship $$h[m] = 2 \cdot 10^{-4} \cdot v[m/s]$$

applies.

Figure 6:
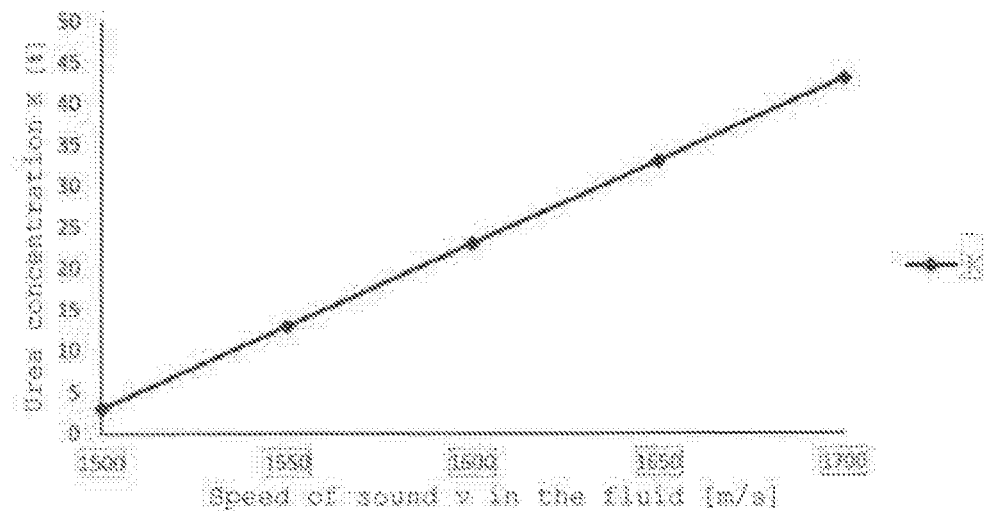
FIG. 6 is a diagram showing an influence of the speed of sound on a concentration information item acquired by the sensor, incorporating teachings of the present disclosure.

FIG. 6 shows a graph which illustrates the functional relationship between the calculated urea concentration K and the speed of sound v in the fluid. According to the example shown, the following applies:

$$K[\%]=2\cdot 10^{-1}\cdot v[m/s]-297.$$

As is apparent from the comparison of FIG. 5 with FIG. 6 or from the calculation examples for the filling level h and the concentration K, the influence of the speed of sound v on the concentration information is approximately 1000 times greater than on the tank filling level information. This is apparent in the example shown here, in particular from the relatively large offset value in the calculation formula for the concentration.

Figure 7:
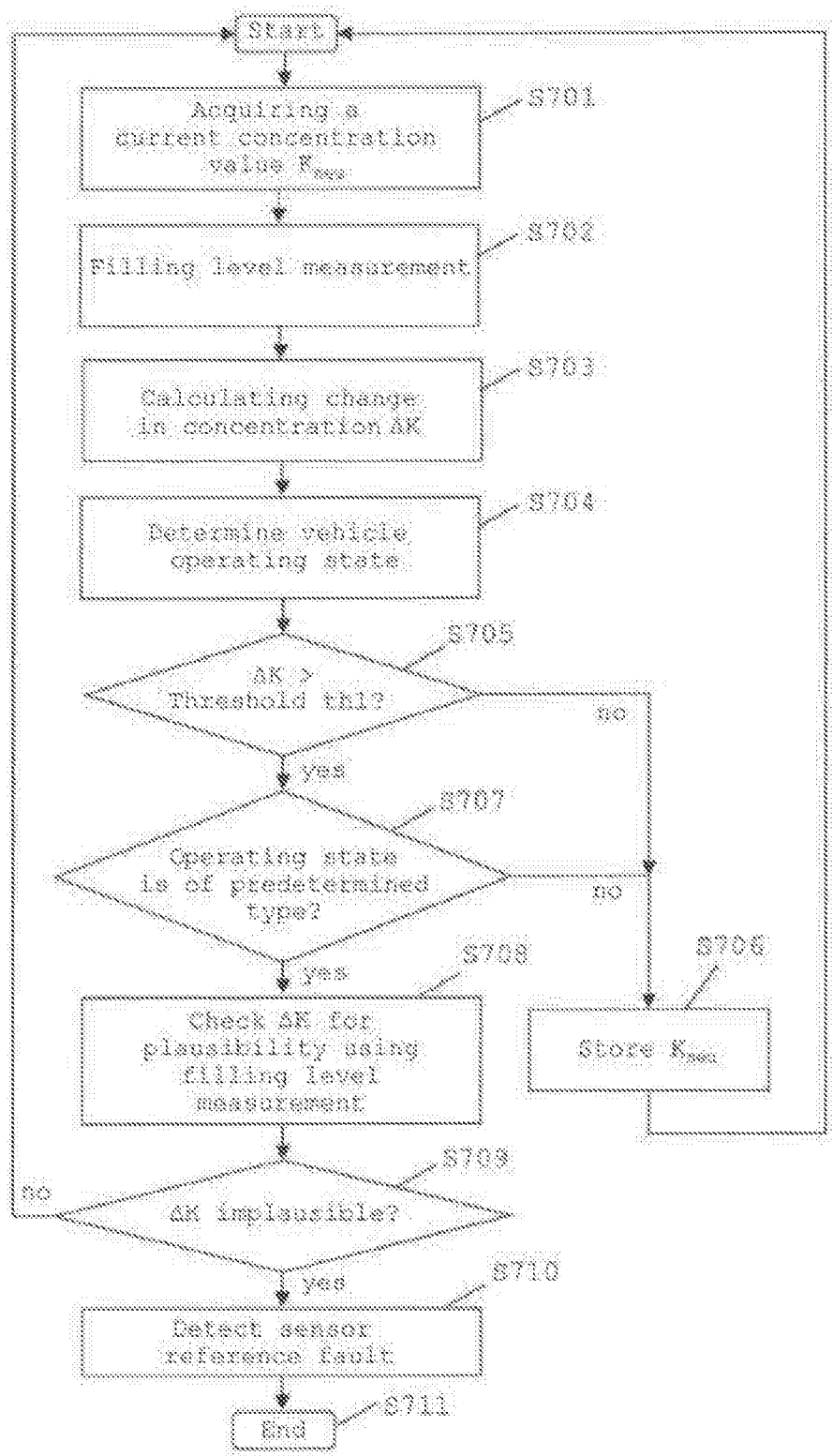
FIG. 7 shows a schematic flow chart of a method for monitoring the fluid content of the storage tank of an SCR system, incorporating teachings of the present disclosure.

FIG. 7 shows a method for monitoring the fluid content 101 of the storage tank 103 according to an embodiment of the teachings of the present disclosure. For the sake of simplicity, the fluid is denoted in the text which follows as additive 101, even though it is possible that the driver of the vehicle has filled a different fluid, for example water, into the tank. The intention is that the method will be able to detect facts. In addition, the filling level is to be monitored. According to the embodiment shown here, the steps shown are carried out under control by the controller 114 shown in FIG. 1, wherein it is assumed that an internal memory of the controller 114 is used to store current and old measured values. In addition, it can be assumed that the controller 114 has, in particular, lookup tables or the like relating, for example, to a ratio between the speed of sound v, on the one hand, and the tank filling level h, on the other. In addition, according to this embodiment, the controller 114 is connected to a central control unit 114 of the vehicle, with the result that a driving cycle or operating state of the vehicle can be read out.

The method starts in step S700. In step S701 a current concentration value $K_{neu}$ is read out. This can be done by means of the methods shown in conjunction with FIGS. 2 to 6. In addition, in step S702 a filling level measurement is carried out, which can also be done in combination with the methods specified above. In this context it is to be noted that the sequence of the steps shown in FIG. 7 is purely by way of example. In step S703, a change in concentration ΔK is determined, which is done here taking into account the current concentration values $K_{neu}$ and an old concentration value $K_{alt}$. In this context, a discontinuous change or a continuous change in the concentration value can be detected. A practical limit is defined as a threshold value th1, starting from which limit the change in concentration ΔK is considered to be significant.

In step S704 the operating state of the vehicle is determined. In this context it can be determined, for example, that the vehicle is traveling in a straight line. In step S705 it is checked whether the change in concentration ΔK exceeds the threshold value th1. If it does not, in step S706 the currently measured concentration value $K_{neu}$ is stored in the memory and the method starts again. However, if it does, it is checked in step S707 whether an operating state is present in which refueling is implausible and in which instead it can be assumed that the filling level h has not been changed. If this is not the case, the method goes to step S706. However, if an operating state which is unsuitable for refueling, in particular a current driving cycle, is present, in step S708 a plausibility check of the measured concentration is carried out.

This is done by also using the filling level measurement carried out in step S702. Alternatively, a repeated filling level measurement is performed. In this way it is possible to determine whether the filling level measurement results in a change in the filling level Δh. For reasons of tolerance, in this context a change in the filling level Δh which is greater than a second predetermined threshold value th2 is considered here. By comparison with the filling level measurement it is possible to determine whether the change in concentration ΔK from step S702 is plausible or not. This is due to the fact that, in comparison with the concentration measurement, the filling level measurement can be carried out using similar methods, in particular by means of a sound measurement. In this way, specifically the measurement principle of the sound measurement or the effect of a speed of sound can be used redundantly, and therefore a plausibility check can be carried out in a simple way.

If in step S709 a result that ΔK is implausible is obtained, the method can start again and continue with the monitoring of the concentration K. However, if as a result ΔK cannot be considered to be plausible, in the next step S710 a fault is output. The fault can firstly be output to the driver, for example by indicating it on a display. The method ends in step S711. In this context, the method can be repeated cyclically or carried out in each driving cycle. If the method is carried out in a driving cycle, the steps S704 and S707 can be considered to have already been taken into account from the outset, with the result that a separate explicit determination of the operating state does not have to be carried out but rather instead already results from the fact that the method is started.

The method according to the embodiment shown makes use of the fact that the medium concentration K of the fluid 101 in the SCR tank 103 can generally only change significantly if a fluid with a different concentration K is filled into the tank 103. This state can be detected in the system 100 by refueling, wherein refueling is detected, in particular, by detection of an increase in the filling level, for example when the vehicle is stationary. In situations in which refueling is not detected or in situations in which refueling is ruled out, for example during travel, a discontinuous change in the concentration information which the sensor possibly supplies is implausible.

If therefore a discontinuous or continuous change occurs in the concentration information K during a driving cycle without refueling having taken place, the change in the concentration value K is compared with the change in the filling level value h, with the result that drifting or falsification is detected in the speed of sound information determined by the sensor, indicating a fault in the reference structure. If, for example, the concentration K changes from 33% to 13% and at the same time the filling level changes from 330 mm to 310 mm, the ratio of ΔK/Δh=(33−13)/(0.33−0.31)=1000 indicates that an incorrect determination of the speed of sound has occurred. This will be explained in more detail below with reference to FIG. 8.

Figure 8:
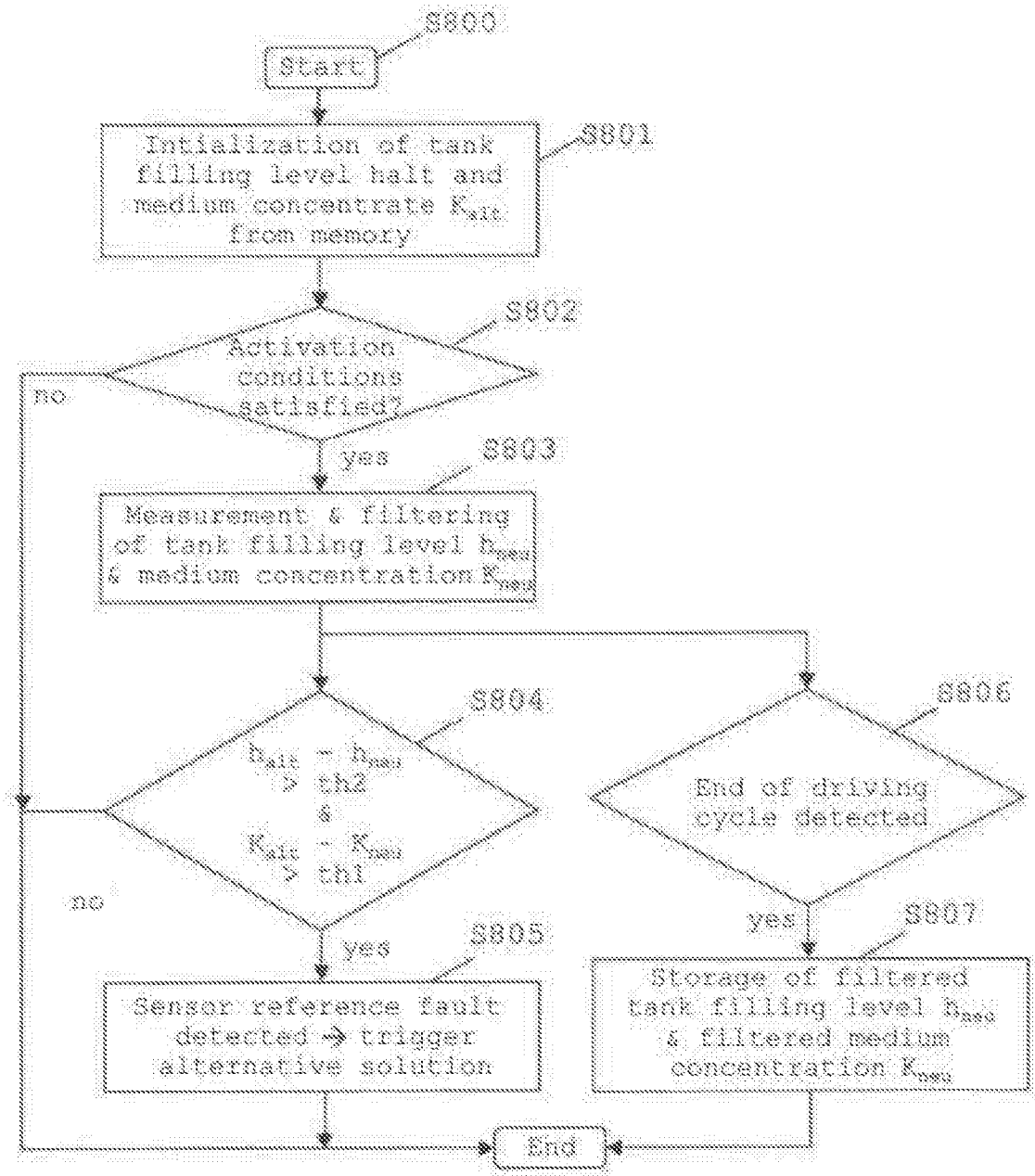
FIG. 8 shows a schematic flowchart of diagnostics for monitoring the medium concentration and the tank filling level in an SCR system, incorporating teachings of the present disclosure.

FIG. 8 shows a schematic sequence of diagnostics for monitoring the medium concentration K and the tank filling level h according to an embodiment of the teachings herein. The method starts in S800. Here, the method goes into a driving cycle and is therefore in a specific operating state in which it is implausible that refueling will be carried out. This can be checked more precisely in step S803. At the start of the driving cycle, in step 801, the last valid value of the tank filling level $h_{alt}$ and the last invalid value of the medium concentration $K_{alt}$ are read from the memory of the control unit 114. In step S802 it is checked whether activation conditions for the diagnostics are satisfied. If this is not the case, the method ends. The activation conditions which are necessary for the diagnostics have, for example, the following criteria: the tank content is not frozen, there is no refueling in the current driving cycle, the tank filling level is above a minimum threshold, the injection quantity<the threshold, etc.

In step S803, the current tank filling level $h_{neu}$ in the storage tank 103 and the current medium concentration $K_{neu}$ are determined by means of filtered measurements. In step S804, the currently filtered sensor values of the concentration K and the level h are compared with the values from the last driving cycle, wherein in step S805, under certain circumstances a fault is detected in the speed of sound v which is measured by the sensor.

In parallel with this, it is checked in step S806 whether the driving cycle is ended. If this is the case, at the end of the driving cycle the current values $L_{neu}$, $K_{neu}$ of the tank filling level and the medium concentration are correspondingly stored in the non-volatile memory.

LIST OF REFERENCE SIGNS

100 SCR system
101 Additive
102 Exhaust system
103 Storage tank
104 Sensor arrangement
105 Reference structure arrangement
106 Surface of liquid
107 Pump
108 Pressure accumulator
109 Drive motor
110 Valve
111 SCR catalytic converter
112 Exhaust gas stream
113 Pressure sensor
114 Controller
201, 202 Sensor
203 Lower surface of the storage tank
204 Emitted wave
205 Reflected wave
211 Sound waves
212, 213 Reflections
206 First reference structure
207 Second reference structure
208 First side face
209 Second side face
210 Mirror structure
K Concentration of the additive
H Filling level
S700-S807 Method steps

What is claimed is:

1. A method for operating a sensor arrangement in a storage tank of an exhaust gas aftertreatment system of an internal combustion engine in a vehicle, wherein the sensor arrangement measures a filling level of the storage tank and a concentration value of a reducing agent in a fluid in the storage tank, the method comprising:
   acquiring a last known filling level of the storage tank and a last known concentration value of the reducing agent;
   measuring a current concentration value of the reducing agent by measuring a speed of sound travelling through the fluid using the sensor arrangement;
   measuring a current filling level of the storage tank using the sensor arrangement;
   calculating a change in concentration value by comparing the current concentration value of the reducing agent with the last known concentration value of the reducing agent;
   determining a current operating state of the vehicle;
   if the current operation state does not allow refilling the storage tank and the calculated change in concentration value exceeds a predetermined threshold value, performing a plausibility check including determining whether a change in the filling level of the storage tank exceeds a second predetermined threshold value; and
   if the plausibility check determines the change in the filling level exceeds the second predetermined threshold value, identifying the calculated change in concentration value as implausible and generating a fault message for the sensor arrangement.

2. The method recited in claim 1, wherein the plausibility check further comprises determining a ratio of the change in concentration value to the change in the filling level of the storage tank.

3. The method recited in claim 1, further comprising storing the current concentration value of the reducing agent and the current filling level of the storage tank in a non-volatile memory upon detecting an end of a driving cycle of the vehicle.

4. A system for monitoring a fluid in a storage tank in an exhaust gas after treatment system for an internal combustion engine in a vehicle, the system comprising:
   a sensor arrangement including a reference structure arranged in the storage tank and a sensor for measuring a speed of sound through the fluid; and
   a controller in communication with the sensor arrangement, the controller programmed to:
   acquire a last known filling level of the storage tank and a last known concentration value of the reducing agent;
   measure a current concentration value of the reducing agent by measuring a speed of sound travelling through the fluid using the sensor arrangement;
   measure a current filling level of the storage tank using the sensor arrangement;
   calculate a change in concentration value by comparing the current concentration value of the reducing agent with the last known concentration value of the reducing agent;
   determine a current operating state of the vehicle;
   if the current operation state does not allow refilling the storage tank and the calculated change in concentration value exceeds a predetermined threshold value, perform a plausibility check including determining whether a change in the filling level of the storage tank exceeds a second predetermined threshold value; and
   if the plausibility check determines the change in the filling level exceeds the second predetermined threshold value, identify the calculated change in concentration value as implausible and generate a fault message for the sensor arrangement.

5. A device as recited in claim 4, wherein the sensor includes an ultrasonic sensor.

6. A vehicle comprising:
   an internal combustion engine;
   a storage tank for a fluid;
   a controller; and
   a sensor in the storage tank and in communication with the central control unit, the sensor configured to measure a concentration of the fluid in the storage tank;
   the controller configured to determine a filling level of the fluid in the storage tank using a measurement on a reference structure to determine of a speed of sound in the fluid;

wherein the controller is programmed to:
acquire a last known filling level of the storage tank and a last known concentration value of the reducing agent;
measure a current concentration value of the reducing agent by measuring a speed of sound travelling through the fluid using the sensor arrangement;
measure a current filling level of the storage tank using the sensor arrangement;
calculate a change in concentration value by comparing the current concentration value of the reducing agent with the last known concentration value of the reducing agent;
determine a current operating state of the vehicle;
if the current operation state does not allow refilling the storage tank and the calculated change in concentration value exceeds a predetermined threshold value, perform a plausibility check including determining whether a change in the filling level of the storage tank exceeds a second predetermined threshold value; and
if the plausibility check determines the change in the filling level exceeds the second predetermined threshold value, identify the calculated change in concentration value as implausible and generate a fault message for the sensor arrangement.

* * * * *